United States Patent [19]
Baisley

[11] Patent Number: 5,656,318
[45] Date of Patent: Aug. 12, 1997

[54] METHOD AND APPARATUS FOR PACKAGING UNCOOKED FOOD PRODUCTS

[76] Inventor: Linda Baisley, 16187 Ornelas, Irwindale, Calif. 91706

[21] Appl. No.: 578,423

[22] Filed: Dec. 26, 1995

[51] Int. Cl.[6] .............................. A21D 8/00; B65B 63/00
[52] U.S. Cl. .............................. 426/410; 53/430; 53/450; 426/124; 426/128; 426/420; 426/503
[58] Field of Search ..................................... 426/410, 420, 426/501, 503, 124, 128, 132; 53/430, 435, 450, 520, 553, 118

[56] References Cited

U.S. PATENT DOCUMENTS

| | | | |
|---|---|---|---|
| 1,873,716 | 8/1932 | Nickerson | 426/420 |
| 5,247,782 | 9/1993 | Rejsa | 53/520 |

Primary Examiner—George Yeung
Attorney, Agent, or Firm—James E. Brunton

[57] ABSTRACT

A method and apparatus for preparing and packaging a wide variety of uncooked food articles, such as uncooked cookie dough, in which the packaged food articles are premixed, shaped and arranged on cooking parchment so that they are ready for cooking immediately upon their removal from the package. In accordance with the method of the invention, a large volume of uncooked food articles can be prepared and packaged in a ready-to-use form for immediate use by high-volume users such as commissaries, schools, major restaurants and like institutions. More particularly, in the practice of one method of the invention large numbers of precisely formed segments of cookie dough are formed and strategically arranged in rows on baking parchment so that the baking parchment can be rolled into unrollable rolls, placed in a suitable shipping container and then, at time of use be readily removed from the package, unrolled and placed directly into a conventional baking oven.

20 Claims, 9 Drawing Sheets

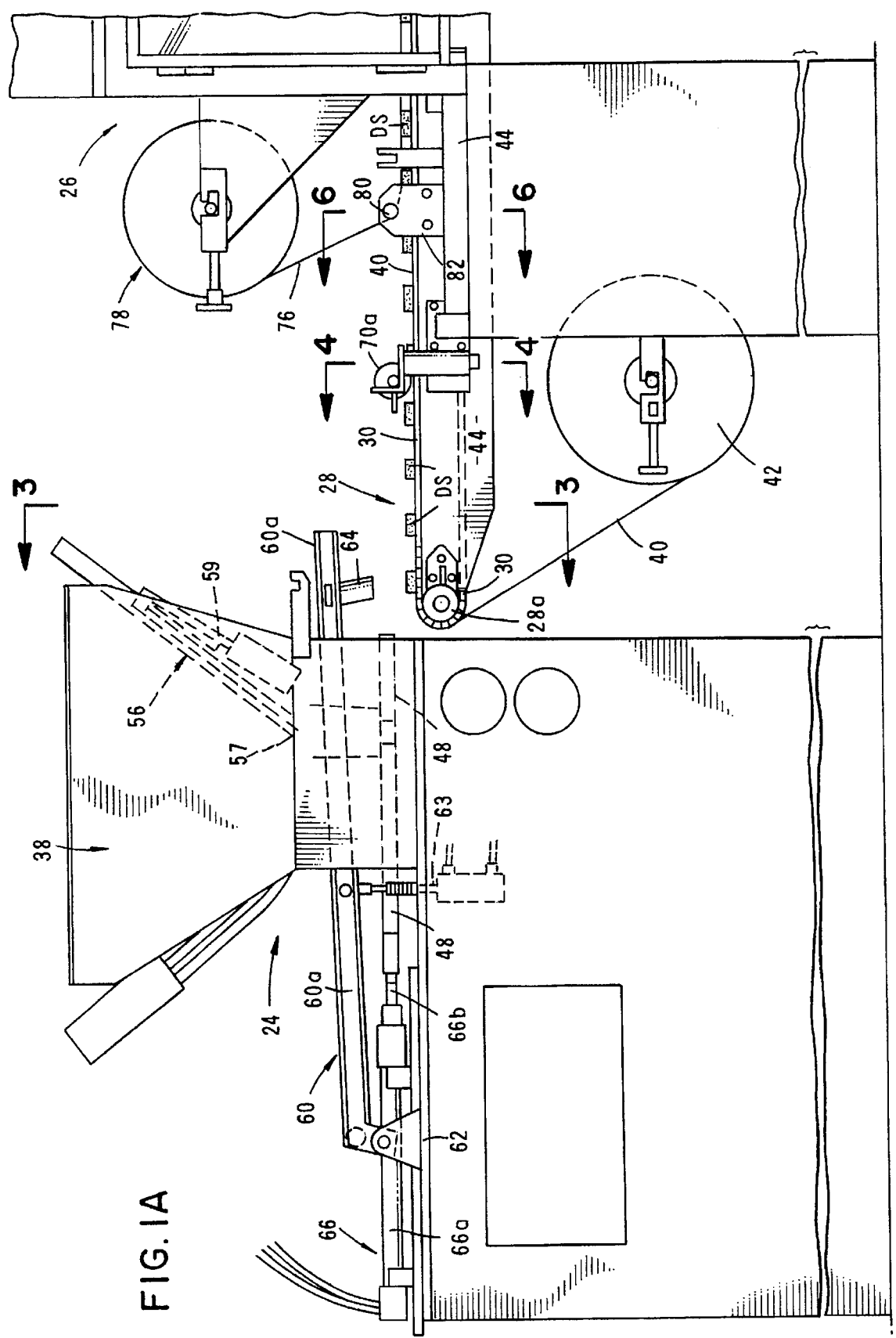

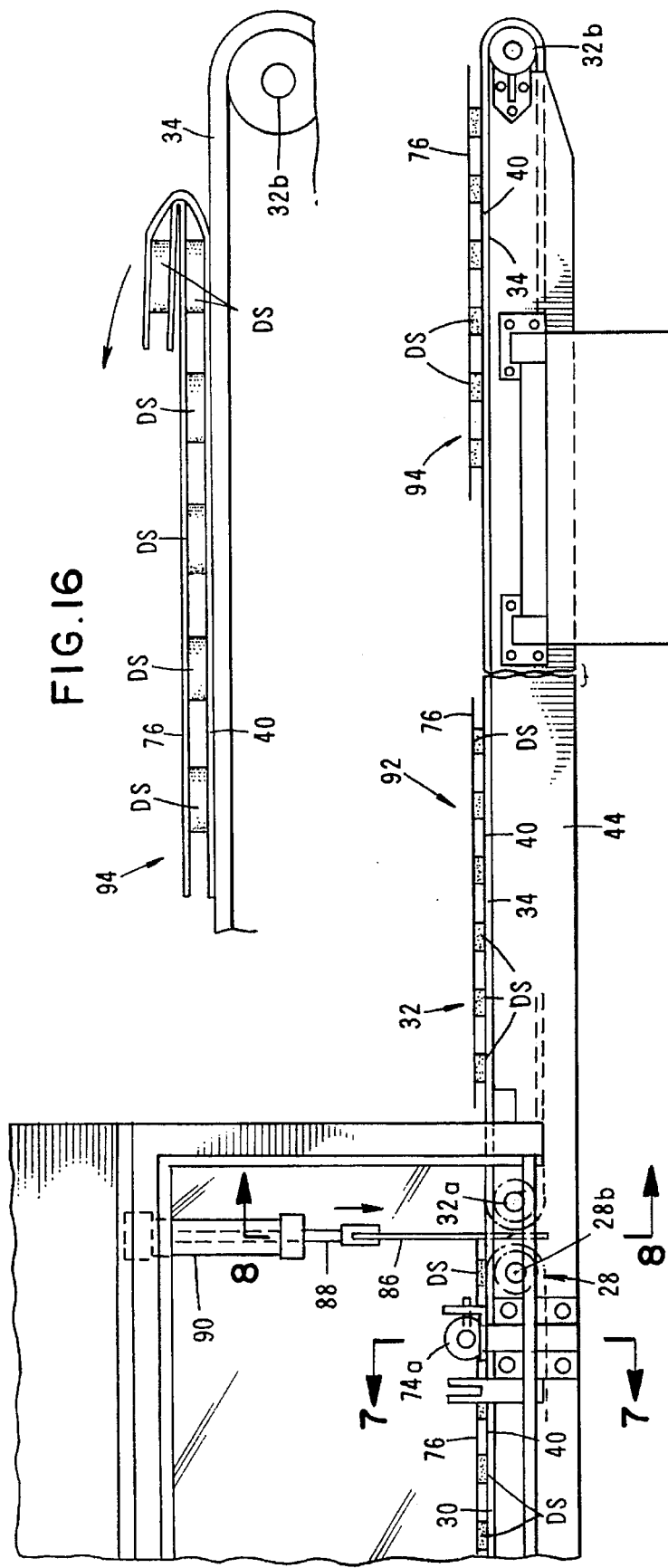

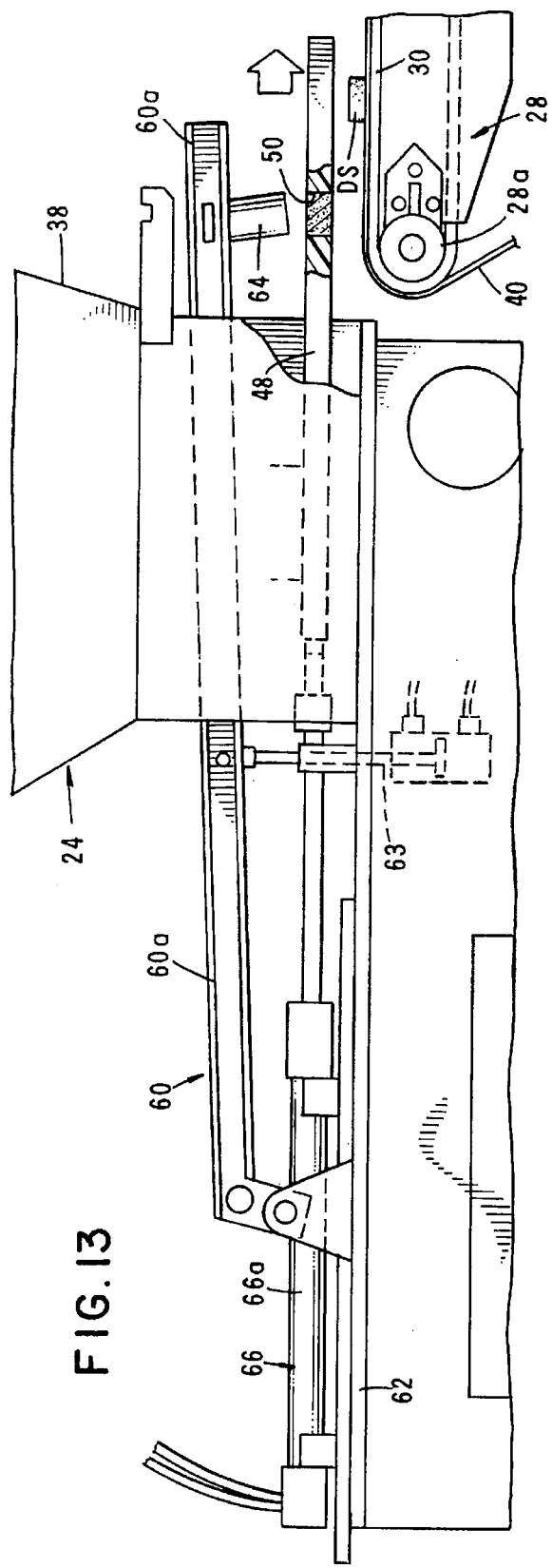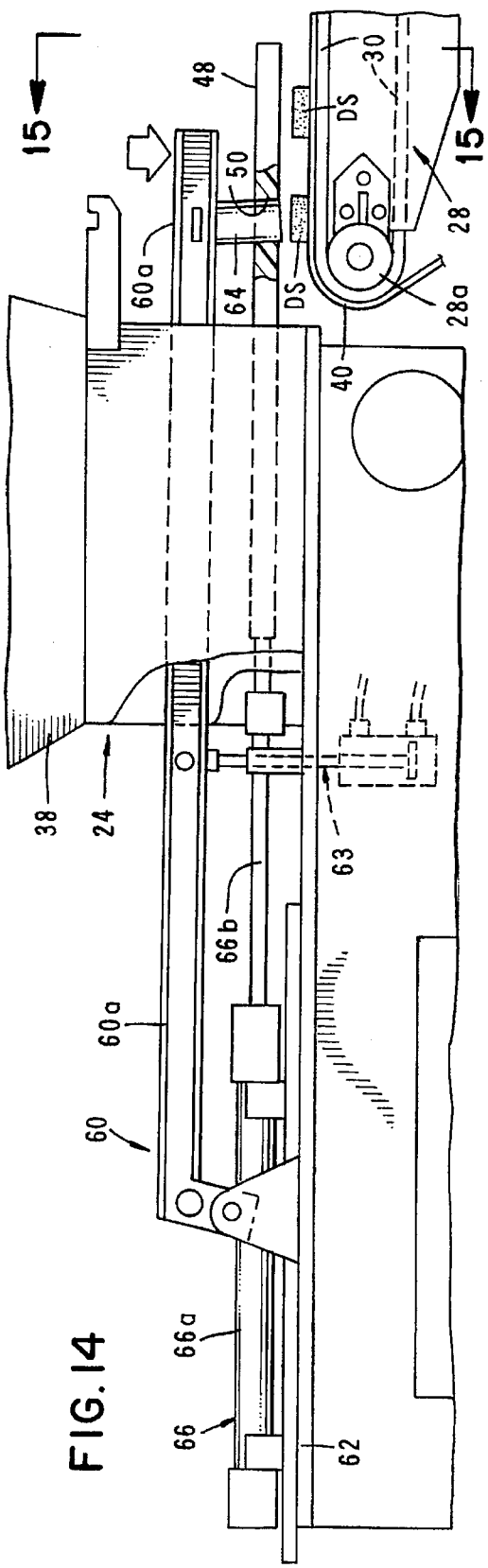

METHOD AND APPARATUS FOR PACKAGING UNCOOKED FOOD PRODUCTS

BACKGROUND OF THE INVENTION

1. Field of the Invention

The present invention relates generally to a method and apparatus for packaging food articles. More particularly, the invention concerns a novel method and apparatus for packaging an uncooked food product such as cookie dough in a ready-to-use form for later baking.

2. Discussion of the Invention

A myriad of food products are now packaged in a ready-to-use state. For example, many types of uncooked or partially cooked food articles such as meats, vegetables, breads and pastries are formed into individual servings and are delivered to restaurants, schools and like institutions in a ready-to-use form.

Uncooked food articles such as ready-to-bake biscuits, rolls and cookies are particularly popular and are readily available in most grocery stores and also from many wholesale grocery outlets and institutional suppliers. Typically, these articles are packaged in generally cylindrically shaped rolls or containers from which the uncooked dough can be removed, formed into individual servings and then placed on baking sheets or the like for cooking. Such products are popular because the ingredients which make up the products are already mixed and are packaged in a ready-to-cook state. However, even with these premixed food products, considerable effort is required to produce the finished food product. For example, the user must typically open the package, remove the dough from the container, form it into the desired shape and serving portion, and then place the uncooked serving portion on an appropriate cooking surface, such as a baking sheet, for cooking. While the effort required is minimal in the case of small volume users, such as homemakers, considerable time and effort is required to produce the final product when these prior art, pre-packaged food products are used by large institutional users such as schools, commissaries, major restaurants and the like.

The thrust of the present invention is to provide a method and apparatus that can supply large volume users with ready-to-use, uncooked food articles which can be removed directly from the package and then cooked without a requirement for any pre-cooking preparation. In one form of the invention, cookie dough is formed into a multiplicity of cookie shaped segments which are placed in spaced-apart rows between sheets of sterile baking parchment to form a laminate which is compactly rolled and then placed into an appropriate container for shipment and storage. To prepare the finished cookies, all the user need do is remove the rolled laminate from the container, unroll it, remove the top sheet of parchment, place the bottom sheet, which carries the cookie segments, into the oven and cook the dough. At no time need the end user handle the cookie dough to form it into appropriately shaped segments and then to transfer the uncooked segments to a cooking surface for baking. In this way a large number of premixed, preshaped and precisely sized cookie dough segments can be baked directly on the packaging medium with which they are delivered to rapidly and efficiently produce high quality cookies in substantial quantities.

In one form of the invention, the method is highly automated so that the food articles are untouched by human hands during the entire forming and packaging process. More particularly, after the ingredients which make up the product are precisely mixed, the apparatus of the invention functions to form the dough into portions of a precise weight, shape and volume. The individual portions are then automatically placed in spaced-apart rows on a length of temperature resistant baking parchment and then covered with a sterile covering, such as a second sheet of parchment, to form a laminate. After the laminate is cut at predetermined locations intermediate selected rows of segments, it is rolled into unrollable rolls and placed into a compact transport and storage container. Throughout the novel packaging process, the dough need not be handled by the operators of the automated apparatus. The process is, therefore, sanitary, labor saving, and highly efficient.

SUMMARY OF THE INVENTION

It is an object of the present invention to provide a novel method and apparatus for preparing and packaging a wide variety of uncooked food articles, such as uncooked cookie dough, in which the packaged food articles are premixed, shaped and arranged on cooking parchment so that they are ready for cooking immediately upon their removal from the package.

It is another object of the invention to provide a method of the aforementioned character in which the uncooked food articles need not be handled or touched by the user prior to cooking.

Another object of the invention is to provide a method as described in the preceding paragraphs in which a relatively large volume of uncooked food articles can be prepared and packaged in a ready-to-use form for use by high-volume users such as commissaries, schools, major restaurants and like institutions.

Another object of the invention is to provide a highly automated, labor saving intensive method and apparatus for preparing and packaging large numbers of precisely formed segments of cookie dough, wherein the formed segments are strategically arranged in rows on baking parchment so that the baking parchment can be rolled into unrollable rolls, placed in a suitable shipping container and then, at time of use, be readily removed from the package, unrolled and placed directly into a conventional baking oven.

Another object of the invention is to provide a method as described in which the food articles are prepared in a highly sterile environment and are not touched by human hands during the forming packaging process or after removal from the package and prior to the cooking step.

Another object of the invention is to provide a method and apparatus for preparing and packaging cookie dough in which each individual cookie dough segment is of a precise weight, shape and volume and is encapsulated between sheets of sterile, temperature resistant parchment prior to being placed in a compact sterile shipping and storage container.

Another object of the invention is to provide a method of the character described herein which is versatile, highly cost effective and readily adaptable for use in preparing and packaging a wide variety of food products.

BRIEF DESCRIPTION OF THE DRAWINGS

FIGS. 1A and 1B together comprise a side-elevational view of one form of the apparatus of the present invention for preparing and packaging cookie dough.

FIG. 13 is a fragmentary, side-elevational view of the hopper subassembly portion of the apparatus of the invention showing advancement of the cookie dough forming plate to a position wherein it is superimposed over the conveyor belt of the first conveyor unit of the invention.

FIG. 14 is a fragmentary side-elevational view similar to FIG. 13 but showing the manner in which the formed cookie dough segment is removed from the forming plate and deposited on the belt of the first conveyor means of the invention.

FIG. 16 is a fragmentary, side-elevational, generally diagrammatic view illustrating the manner in which the laminate made up of the cookie dough segments and the first and second sheets of heat resistant material is rolled to form the unrollable roll which is then placed into an appropriate shipping and storage container.

DESCRIPTION OF THE INVENTION

Figure 2A:
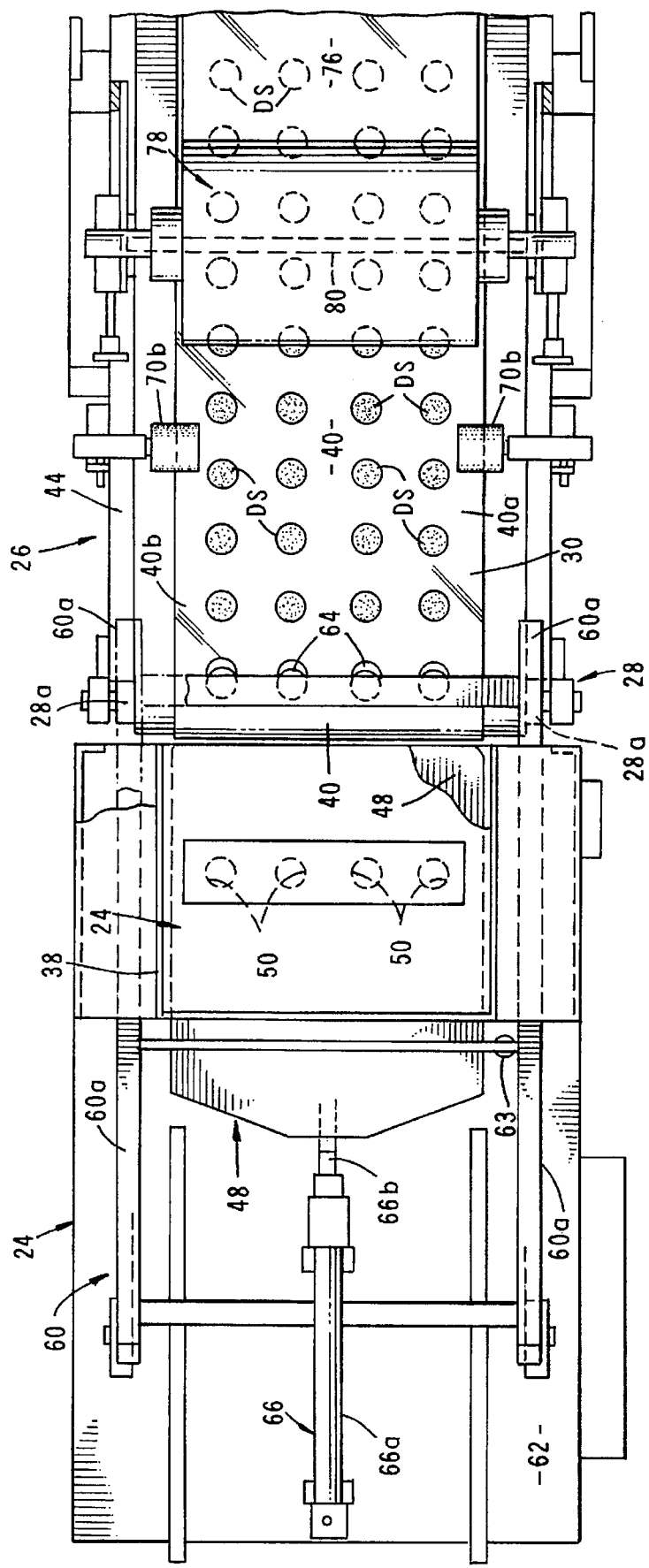
FIGS. 2A and 2B together comprise a top plan view of the apparatus shown in FIGS. 1A and 1B.

Referring to the drawings and particularly to FIGS. 1A, 1B, 2A and 2B, one form of the apparatus of the present invention for preparing and packaging cookie dough is there illustrated. The apparatus of this embodiment of the invention comprises a pair of cooperating major subassemblies, namely a hopper subassembly generally designated by the numeral 24 and a conveyor subassembly generally designated by the numeral 26. The conveyor subassembly 26 comprises a first conveyor unit 28 having an endless first conveyor belt 30 (FIG. 1A) and a second conveyor unit 32 having a second endless conveyor belt 34 (FIG. 1B). Conveyor units 28 and 32 are of conventional construction with belts 30 and 34 being entrained and are driven around end rollers 28a and 28b and 32a and 32b respectively. End rollers 28a and 32a are driven by conventional driving means, such as electric motors (not shown) of a character well known by those skilled in the art.

The hopper subassembly 24 of the invention comprises a conventional open top hopper 38 within which the completely mixed and partially chilled cookie dough is received. Also comprising a part of the hopper subassembly 24 is forming means for forming the cookie dough into shaped segments and then depositing the shaped segments onto a first length of heat resistant sheet material 40 which travels forwardly of the apparatus along with first conveyor belt 30. Length of material 40, preferably comprises a commercially available baking parchment that is continuously removed from a roll 42 of parchment material which is carried by the supporting frame 44 of the first conveyor unit 28. The means for removing the length of material 40 from roll 42 comprises first and second roller means the character of which will be further described hereinafter. A baking parchment suitable for use in carrying out the method of the invention is available from a number of commercial sources, such as the Paper Con Company of Atlanta, Ga., and is capable of withstanding oven temperatures in excess of 350 degrees Fahrenheit.

Figure 19:
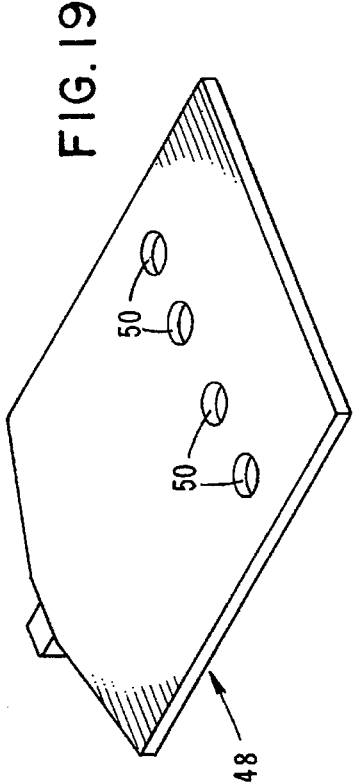
FIG. 19 is a generally perspective view of the cookie dough segment forming plate of the invention which is reciprocally movable within the hopper of the apparatus.
Figure 2B:
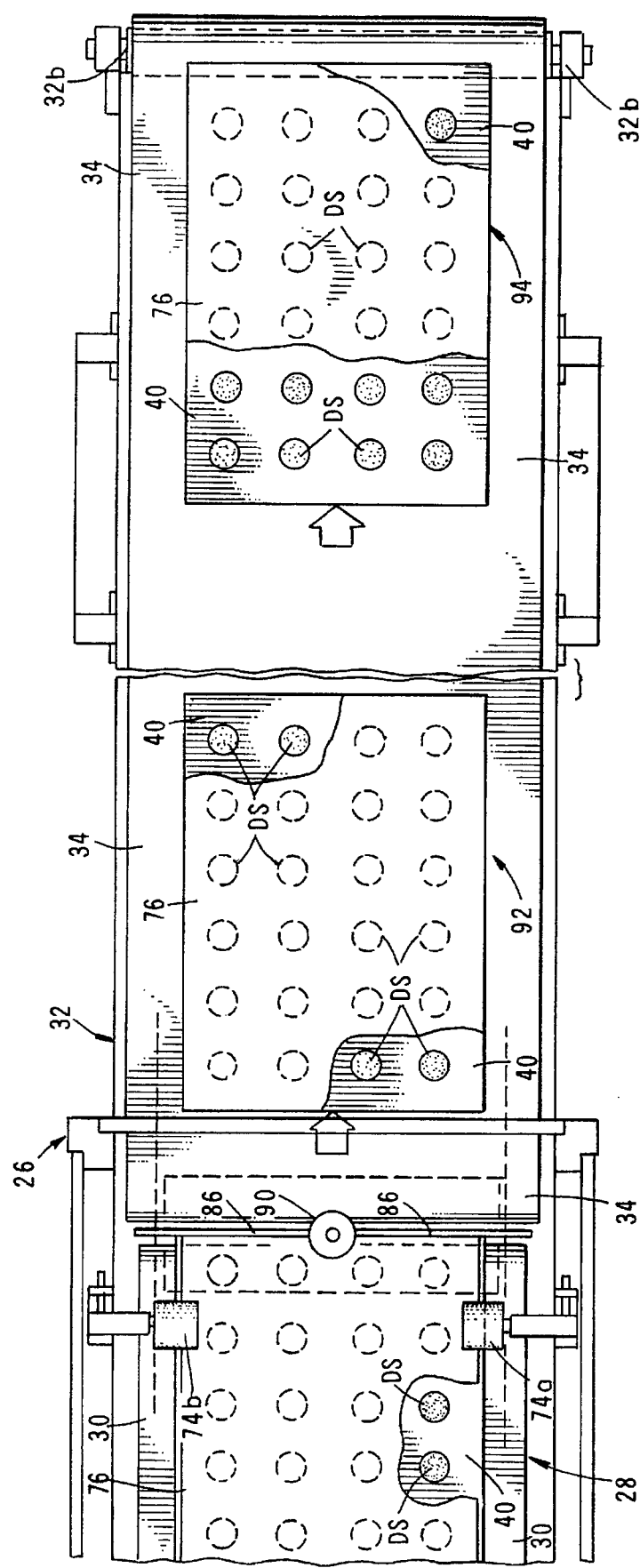
Figure 3:
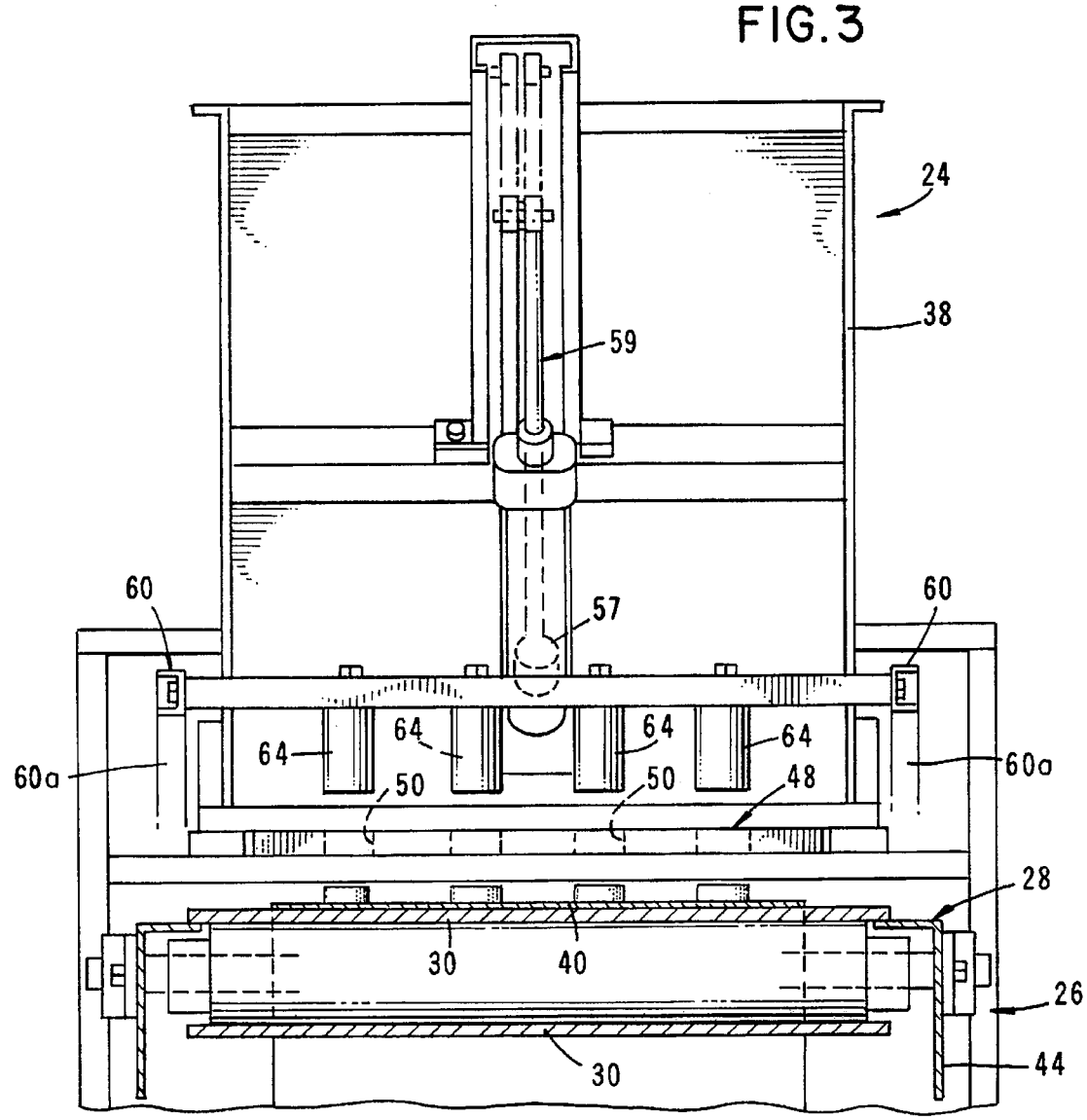
FIG. 3 is an enlarged view taken along lines 3—3 of FIG. 1A.

Turning particularly to FIGS. 10, 11, 12, and 19, the forming means of the present embodiment of the invention comprises a forming plate 48 which is generally paddle shaped and is provided with a plurality of transversely spaced-apart apertures 50 (FIG. 19). Apertures 50 have a diameter substantially equal to the preferred diameter of the cookie dough segments which are to be formed in accordance with the method of the invention. Also comprising a part of the forming means of the invention, is compaction or tamping means for packing the chilled dough "D" that has been deposited within hopper 38 into the apertures 50 of forming plate 48 in the manner shown in FIGS. 10 and 11. While the dough compaction means can take various forms, in the embodiment of the invention shown in the drawings, this means comprises a compaction subassembly generally designated in FIGS. 1A and 10 by the numeral 56. Subassembly 56 forms a part of the hopper subassembly of the apparatus and includes a compaction member 57 which is continuously moved upwardly and downwardly within the hopper as indicated by the dotted lines in FIG. 1A by a hydraulically actuated arm 59 that is pivotally connected to hopper 38 in the manner shown in FIG. 3. As member 57 moves downwardly, it will compact the chilled dough and press a portion thereof into the forming apertures 50. Compaction units such as that shown in the drawings are well known to those skilled in the art and are generally available from commercial suppliers of hopper units of the general character illustrated in the drawings.

After the chilled dough has been compacted and packed into apertures 50 of plate 48, the next step in the method of the invention is to controllably deposit the shaped dough segments onto the first length 40 of the heat resistant material which is traveling forwardly of the apparatus along with conveyor belt 30. This deposition step is accomplished by deposition means which also comprises a part of hopper subassembly 24. This deposition means here includes a pivotally mounted arm assembly 60 of the character best seen in FIGS. 1A, 13, and 14. As shown in these drawings, arm 60a of the assembly is pivotally connected proximate its outboard end to the upper wall 62 of hopper assembly 24 and is provided proximate its opposite inboard end with a series of transversely spaced pusher members 64. Pusher members 64 are indexable with apertures 50 of plate 48 as plate 48 is moved into the advanced position shown in FIGS. 13 and 14 and are moved into apertures 50 by a hydraulically operated mechanism 66, the character of which will presently be described.

As shown in FIG. 14, with plate 48 in the advanced position, a downward pivotal movement of the inboard end of arm 60a will cause pusher members 64 to enter apertures 50 of plate 48 and in so doing will force the compacted cookie dough segments "DS" outwardly of apertures 50. Arm 60a is moved upwardly and downwardly by a hydraulically operated mechanism 63 of conventional construction which is mounted on hopper subassembly 24 in the manner shown in FIG. 1A. After segments "DS" have been pushed from apertures 50, they will drop by force of gravity onto the upper surface of heat resistant sheet 40 which overlays the first conveyor belt 30 of the first conveyor unit in the manner shown in FIG. 14.

As best seen by referring particularly to FIG. 1A and 13, the previously mentioned, hydraulically operated mechanism 66 forms a part of hopper subassembly 24 and functions to reciprocally move forming plate 48 between the first retracted position shown in FIG. 1A and the second extended position shown in FIG. 13 wherein the apertures 50 formed in plate 48 overlay conveyor belt 30 and the length of parchment 40 resting thereon. Mechanism 66 is of a character well known to those skilled in the art and includes a cylinder 66a within which a piston reciprocates to move a connecting rod 66b to which plate 48 is connected reciprocally between the first and second positions shown in FIGS. 1A and 13.

Following removal of the cookie dough segments "DS" from the plate 48 in the manner shown in FIG. 14, the plate is once again moved inwardly of the hopper so that apertures 50 can be refilled by the compaction means with the compressed cookie dough that has been deposited within the hopper. After the apertures have been filled with dough, plate 48 is once again moved by mechanism 66 to the advanced position shown in FIG. 13 where another row of cookie dough segments "DS" can be deposited onto the upper surface of sheet 40 in the manner shown in FIGS. 2A and 14. This process continues so that a plurality of longitudinally spaced-apart rows of cookie dough segments "DS" are sequentially deposited on sheet 40 in the manner indicated in FIG. 2A.

Figure 4:
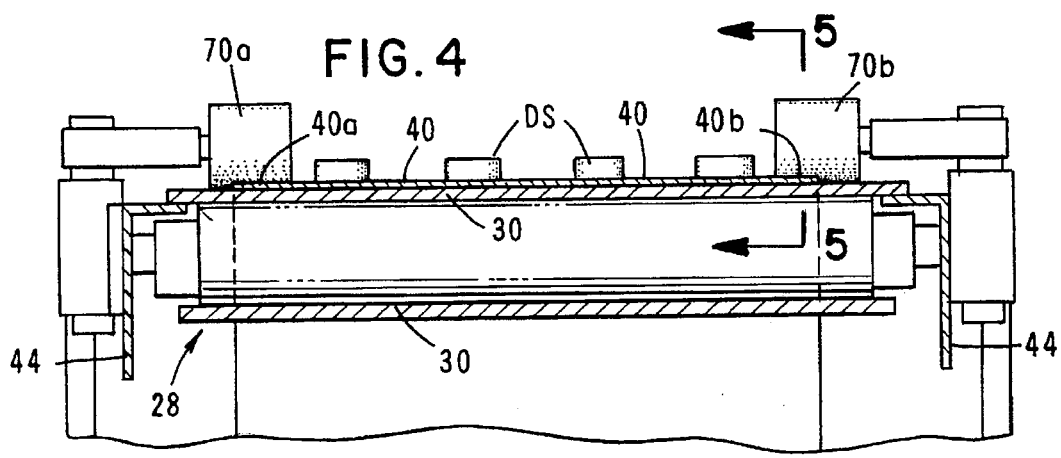
FIG. 4 is a cross-sectional view taken along lines 4—4 of FIG. 1A.
Figure 5:
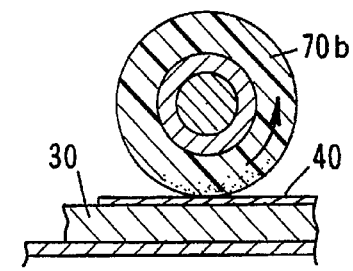
FIG. 5 is an enlarged, cross-sectional view taken along lines 5—5 of FIG. 4.

Referring next to FIGS. 2A, 4 and 5, the previously identified first roller means for removing length 40 of heat resistant sheet material from roll 42 can be seen to comprise a pair of rollers 70a and 70b which are disposed on opposite sides of conveyor belt 30 (FIG. 24). Rollers 70a and 70b are rotatably carried by supporting frame 44 for capturing the marginal edge portions 40a and 40b of sheet 40 between the rollers and the upper surface of conveyor belt 30 (FIG. 4). Rollers 40a and 40b compressively engage the marginal portions of sheet 40 so as to create sufficient frictional forces to cause the sheet to be progressively unrolled from roll 42 where it is entrained about roller 28a and belt 30 in the manner indicated in FIG. 1A. In this way the sheet of parchment will smoothly travel along with the upper surface of conveyor belt 30 as belt 30 travels forwardly of the apparatus and around end roller 28a.

As length 40 of the heat resistant sheet material moves forwardly, the leading edge thereof will pass beneath second roller means shown here as a second pair of oppositely disposed rollers 74a and 74b. These rollers, like rollers 70a and 70b compressively engage the marginal portions of sheet 40 so as to create sufficient frictional forces which, in cooperation with the forces generated by rollers 70a and 70b, cause the sheet to be progressively unrolled from roll 42 and to pass forwardly of the apparatus in a direction toward second conveyor belt 32. As length 40 of the heat resistant sheet material moves forwardly of the apparatus, the plurality of segments of cookie dough deposited thereof will also uniformly move forwardly of the apparatus in the manner best seen in FIG. 2A.

Figure 6:
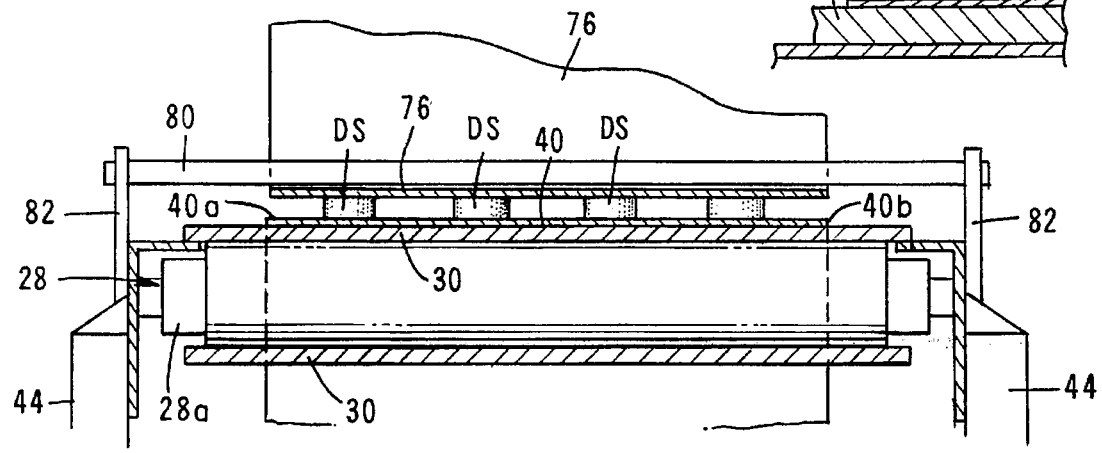
FIG. 6 is an enlarged, cross-sectional view taken along lines 6—6 of FIG. 1A.
Figure 7:
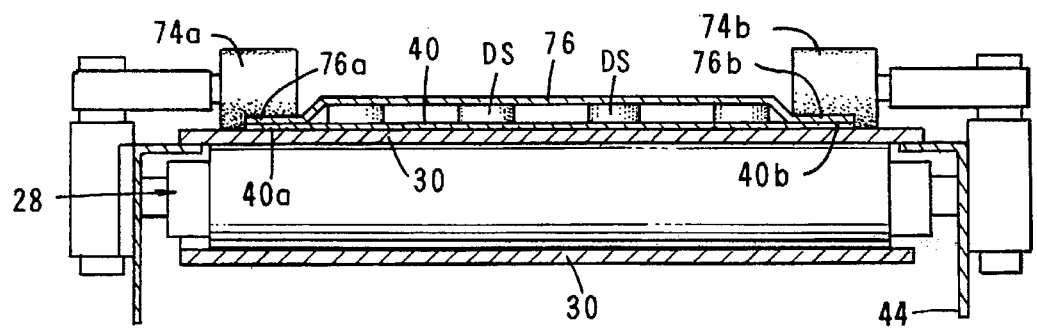
FIG. 7 is an enlarged, cross-sectional view taken along lines 7—7 of FIG. 1B.
Figure 8:
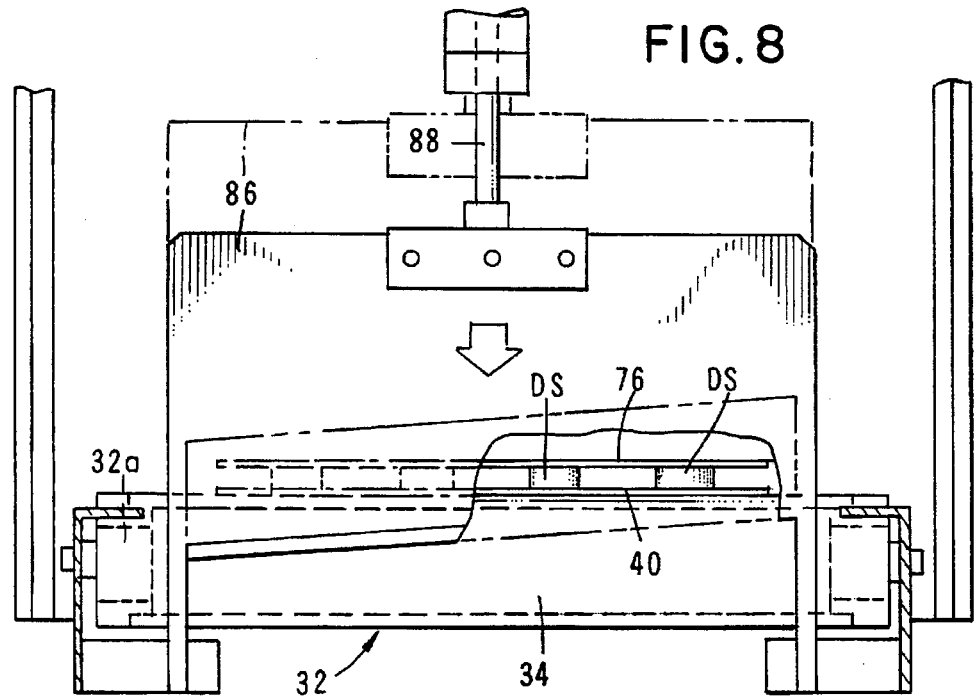
FIG. 8 is an enlarged, cross-sectional view taken along lines 8—8 of FIG. 1B.

As can best be seen by referring to FIGS. 1A, 6, and 7, a covering sheet 76, which may also comprise a heat resistant material such as a baking parchment, is withdrawn from a roll 78 of covering material. Roll 78 is rotatably mounted to frame 44 in the manner shown in FIG. 1A. As the sheet of covering material 76 is removed from roller 78, it will pass beneath a guide bar 80 (FIG. 6) the opposite ends of which are supported by support brackets 82. Brackets 82 are connected to supporting frame 44 so that the brackets extend transversely of conveyor belt 30 at a location proximate end rollers 28b. As the sheet of covering material 76 moves beneath guide bar 80, it will travel forwardly of the apparatus to a position where its marginal edges 76a and 76b extend beneath oppositely disposed rollers 74a and 74b extend beneath in the manner shown in FIG. 7. As shown in FIG. 7, edges 74a and 74b will, in fact, be uniquely captured between the marginal edges 40a and 40b of sheet 40 and rollers 74a and 74b. With this arrangement, the frictional forces imposed on the sheet material by rollers 74 will cause the covering sheet to be uniformly unrolled from roll 78 and to uniformly travel forwardly of the apparatus along with sheet 40 and conveyor belt 30. As best seen by referring to FIG. 6, as the covering sheet 76 is withdrawn from roll 78 it will pass beneath guide bar 80 and will overlay the plurality of rows of spaced-apart dough segments "DS" in a manner to form a laminate comprising sheet 40, cookie dough segments "DS", and covering sheet 76 (FIG. 7). The laminate thus described will continue to travel forwardly of the apparatus in the manner shown in FIG. 1B so that the laminate will bridge the gap between conveyor systems 30 and 32 and extend forwardly into belt 34 of the second conveyor system.

Figure 9:
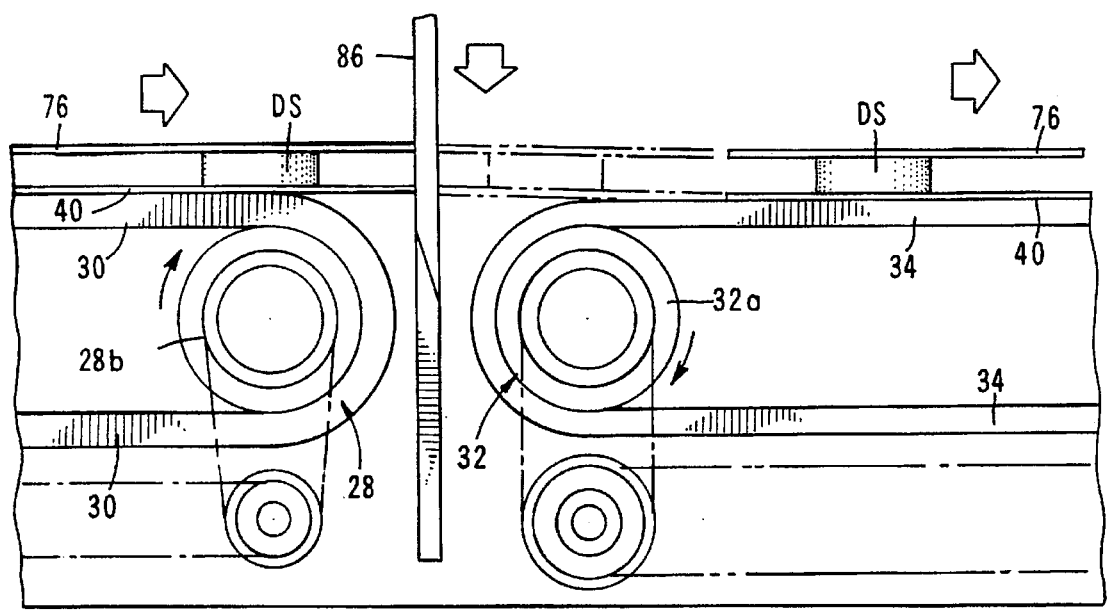
FIG. 9 is a greatly enlarged, side-elevational view illustrating the manner in which the cutting means of the invention is receivable between the first and second conveyor assemblies of the apparatus of the invention.
Figure 10:
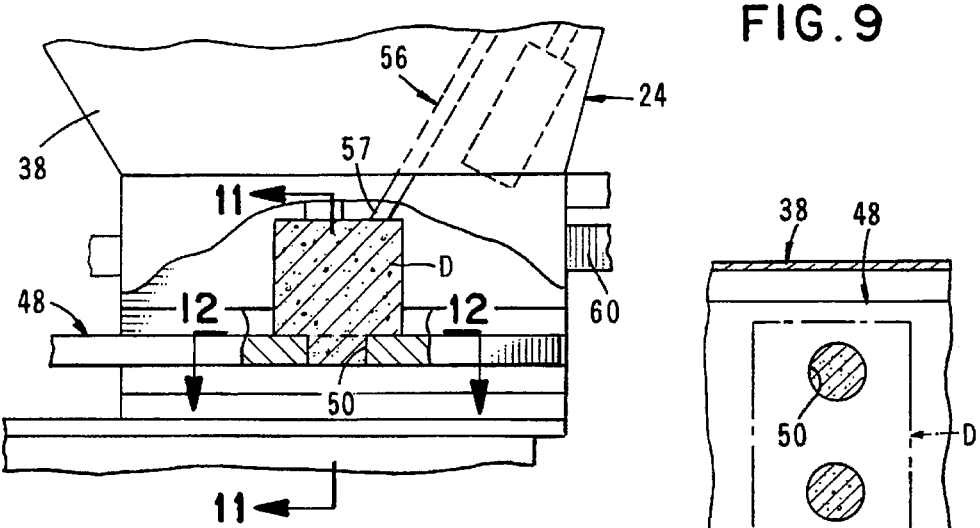
FIG. 10 is an enlarged, generally diagrammatic view of a portion of the hopper of the invention illustrating the manner in which the cookie dough is compacted or tamped downwardly and formed into a plurality of cookie dough segments.
Figure 12:
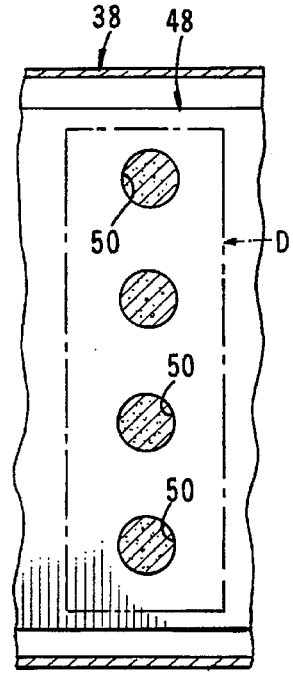
FIG. 12 is a cross-sectional view taken along lines 12—12 of FIG. 10.
Figure 11:
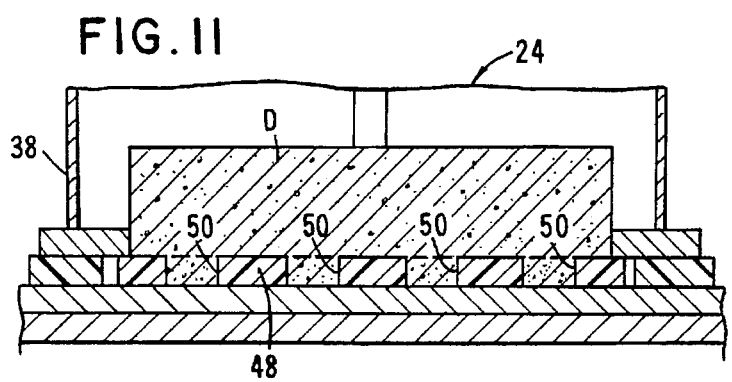
FIG. 11 is a cross-sectional view taken along lines 11—11 of FIG. 10.
Figure 15:
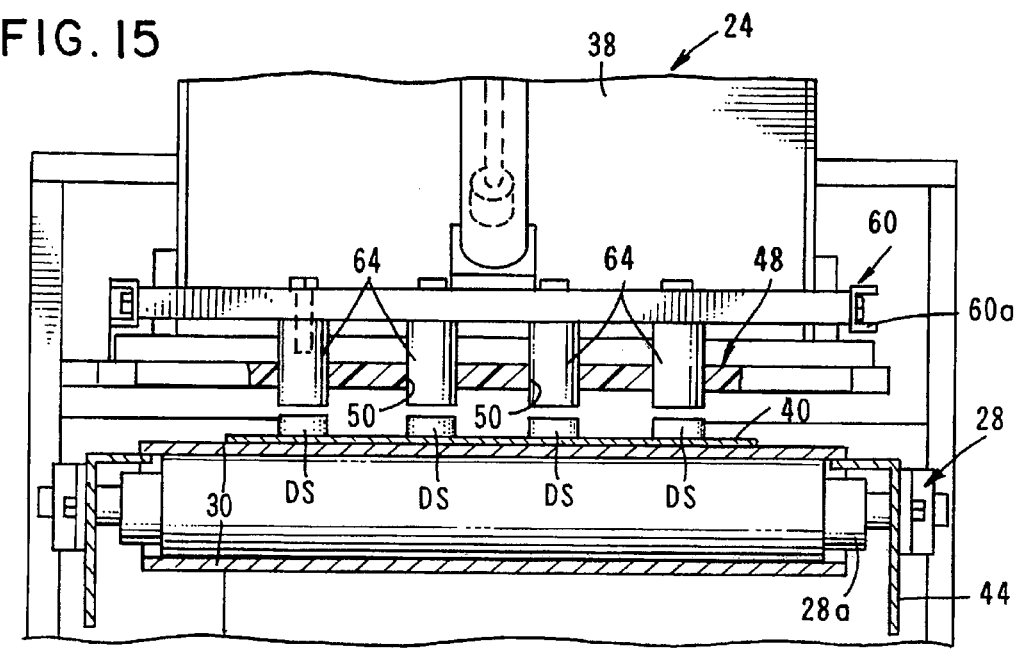
FIG. 15 is a view taken along lines 15—15 of FIG. 14 further illustrating the manner in which the shaped cookie dough segments are deposited on the conveyor belt.

An important feature of the apparatus of the present invention comprises a novel laminate cutting means which is carried by supporting frame 44 for cutting the length of heat resistant sheet material 40 and the length of covering material 76 of the previously described laminate at a located intermediate the first and second conveyor belts 30 and 32. In the form of the invention shown in the drawings, the cutting means includes a cutting blade 86 which is carried by supporting frame 44 for movement between a first upraised position to a second lowered position wherein the cutting blade extends between first and second conveyor belts 30 and 32 in the manner best seen in FIG. 1B and 9. In the present embodiment of the invention, cutting blade 86 is connected with a connector rod 88 of a hydraulically operated system 90 which is carried by frame 44. When system 90 is actuated, blade 86 will automatically move in a reciprocating motion between its upward position to its downward position. As the blade moves from the upward position to the downward position, it will pass between selected rows of the cookie dough segments and will clearly cut through covering sheet 76 and heat resistant sheet 40. The laminate thus formed, which comprises sheets 40 and 76 and a plurality of rows of cookie dough segments "DS", will continue to move forwardly of conveyer belt 34 in the manner indicated in FIG. 1B. Since second conveyor belt 34 is moving at a faster rate of speed than first conveyor belt 30, the laminate sections thus formed which are generally designated as 92 and 94 in FIG. 1B, will tend to separate from one another in the manner shown in FIGS. 1B and 2B. Hydraulically operated subassembly 90 which drives the reciprocating cutting blade is of a character well known to those skilled in the art and can be operated either by compressed air or a suitable hydraulic fluid. The design installation and operation of these types of hydraulic systems are well known to those skilled in the art.

When laminate 94 reaches the position shown in FIG. 1B, the leading edge thereof will be folded over in the manner illustrated in FIG. 16 so that the adjacent rows of cookie dough segments "DS" are stacked one upon the to form a sandwich-like construction. After the laminate is rolled to form an unrollable roll of cookie dough segments, the rolled laminate is placed into a compact transport and storage container (not shown) for delivery to the end user. In appropriate situations, the packaged rolled laminate can be frozen in an appropriate freezer prior to shipment.

Figure 17:
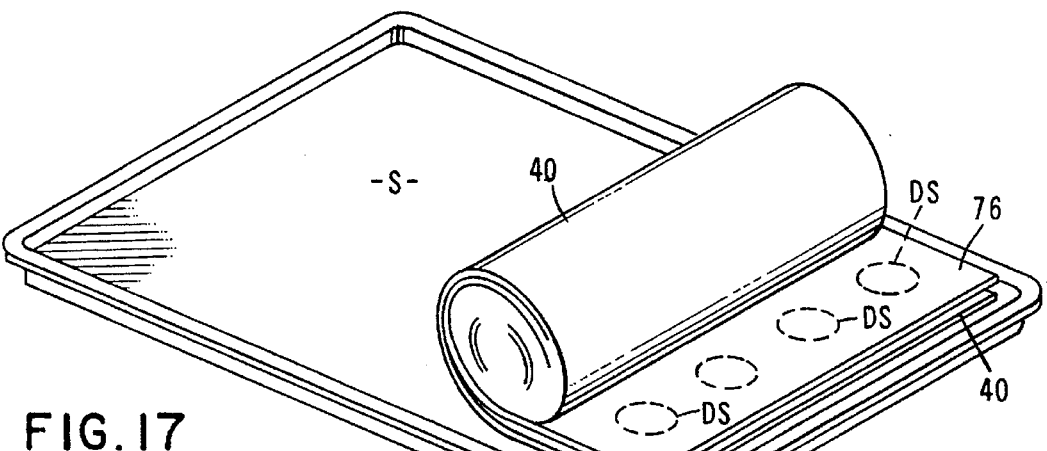
FIG. 17 is a generally perspective, diagrammatic view illustrating the unrolling of the rolled laminate after it has been removed from the shipping container.
Figure 18:
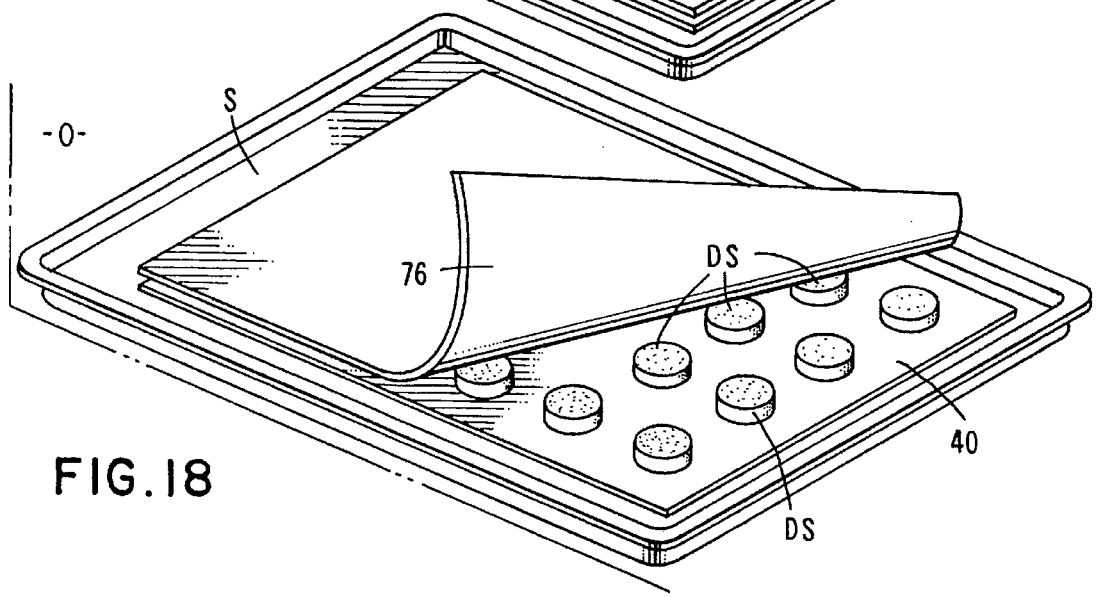
FIG. 18 is a generally perspective, diagrammatic view illustrating the final step prior to baking of the segments, namely removing the upper covering sheet to expose the individual shaped cookie dough segments which have been deposited on the lower sheet of heat resistant material.

Turning next to FIGS. 17 and 18, when the compactly packaged rolled laminate is received by the end user, all that need be done is to remove the rolled laminate from the container, place it on a surface "S" such as the surface of an appropriate baking oven "O", and then unroll the rolled laminate in a manner indicated in FIG. 17. As shown in FIG. 18, once the rolled laminate is completely unrolled, the covering sheet 76 is removed to expose the plurality of rows of spaced-apart, uncooked cookie dough segments "DS". With the covering sheet 76 removed, the baking assemblage thus formed which includes the cookie dough segments can be baked at an appropriate temperature for a predetermined length of time to form finished cookies. It is apparent that during the entire process from the point in time in which the cookie dough is deposited into the hopper until the final product is completed, the cookie dough segments need not be handled either by the operators of the apparatus or by the end users of the product.

By way of summary, one form of the method of the present invention for preparing, packaging and cooking cookie dough using equipment of the character described in the preceding paragraphs comprises the steps of removing from a first roll a length of baking parchment 40 and placing the baking parchment on a conveyor belt such as conveyor belt 30. This done, the mixed ingredients which form the uncooked cookie dough are deposited into an open top hopper, such as hopper 38, and are compacted to form a mass of compacted cookie dough. Using the forming plate 48, the compacted cookie dough is then formed into a plurality of cookie shaped segments which are deposited on the first length 40 of the baking parchment in a plurality of longitudinally spaced rows. After the rows of uncooked cookie shaped segments are deposited on the first length of baking parchment, a second length of covering such as baking parchment 76 is removed from a roll of such baking parchment and is overlayed over the plurality of rows of cookie shaped segments to form a laminate. The laminate thus formed is next cut at predetermined locations between selected rows of cookie dough segments to form a cut laminate. The cut laminate is the rolled upon itself to form an unrollable roll which is placed into a suitable shipping and storage container. Finally, at the point of use, the end user removes the unrolled roll from the container and unrolls it onto a suitable cooking surface to form a generally planar laminate. Finally, the second length of baking parchment, such as parchment 76, is removed from the generally planar laminate to form a baking assemblage which is then placed in the oven "O" for baking. As previously mentioned, in the preferred form of the invention, the uncooked cookie dough is chilled prior to placing it in the open top hopper 38. Additionally, for certain end applications, it is also desirable to freeze the unrollable roll either prior to or after it has been placed into the appropriate storage and shipping container.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method of packaging an uncooked food product made from several ingredients for later baking involving the use of an endless belt conveyor said method comprising the steps of:

(a) placing a length of baking parchment on the belt conveyor;

(b) mixing the several ingredients which make up the food product to form a dough;

(c) compacting the dough to form a mass of compacted dough;

(d) forming from said mass of compacted dough a plurality of uncooked segments, each having the general shape of the food product to be produced;

(e) placing a plurality of rows of uncooked food segments on said length of baking parchment;

(f) placing a covering sheet over said plurality of rows of food segments to form a laminate comprising said length of baking parchment, said plurality of rows of uncooked food segments and said covering sheet;

(g) rolling said laminate to form a roll; and (h) placing said roll in a container.

2. A method as defined in claim 1 in which said length of baking parchment is unrolled from a roll of baking parchment, in which said covering sheet is unrolled from a roll of covering sheet and in which said method comprises the further step of simultaneously cutting said length of baking parchment and said covering sheet following forming of said laminate.

3. A method as defined in claim 1 in which said dough comprises a cookie dough for use in making cookies.

4. A method as defined in claim 3 including the further step of chilling said dough prior to compacting said dough.

5. A method as defined in claim 4 including the further step of freezing said roll.

6. A method of preparing and packaging cookie dough made from several ingredients using an apparatus including a conveyor belt and first and second rolls of baking parchment rotatably mounted proximate the conveyor belt and cutting means for cutting the baking parchment, said method comprising the steps of:

(a) removing from said first roll a first length of baking parchment and placing said first length of baking parchment on the conveyor belt;

(b) mixing the several ingredients which make up the cookie dough to form an uncooked dough;

(c) compacting said uncooked cookie dough to form a mass of compacted cookie dough;

(d) forming from said mass of compacted cookie dough a plurality of cookie shaped segments;

(e) placing a plurality of rows of cookie shaped segments on said first length of baking parchment;

(f) removing a second length of baking parchment from said second roll of baking parchment and overlaying said second length of baking parchment over said plurality of rolls of cookie shaped segments to form a laminate comprising said first length of baking parchment, said plurality of rows of cookie shaped segments and a second length of baking parchment;

(g) cutting said first and second lengths of baking parchment to form a cut laminate;

(h) rolling said cut laminate to form a roll; and (i) placing said unrollable roll in a container.

7. A method as defined in claim 6 in which said method comprises the further step of cooling said cookie dough prior to compacting said cookie dough.

8. A method as defined in claim 6 in which the apparatus used in the method of preparing and packaging cookie dough further includes a hopper for receiving the uncooked cookie dough and in which the method includes the further step of compacting the uncooked cookie dough within the hopper.

9. A method as defined in claim 8 in which said apparatus used in the method of preparing and packaging the cookie dough further includes automatic cutting means for cutting the parchment and in which the method includes the further step of cutting of said first and second lengths of baking parchment into discrete lengths.

10. A method as defined in claim 8 including the further step of freezing said unrollable roll.

11. A method of preparing, packaging and cooking cookie dough made from several ingredients using equipment comprising a conveyor subassembly having a conveyor belt, a hopper disposed over a portion of the conveyor subassembly, first and second rolls of baking parchment rotatably mounted proximate the conveyor subassembly and a baking oven, said method comprising the steps of:

(a) removing from said first roll a first length of baking parchment and placing said first length of baking parchment on the conveyor belt;

(b) mixing the ingredients which make up the cookie dough to form an uncooked dough;

(c) compacting said uncooked cookie dough to form a mass of compacted cookie dough;

(d) forming from said mass of compacted cookie dough a plurality of cookie shaped segments;

(e) placing a plurality of rows of uncooked cookie shaped segments on said first length of baking parchment;

(f) removing a second length of baking parchment from said second roll of baking parchment and overlaying said second length of baking parchment over said plurality of rows of cookie shaped segments to form a laminate comprising said first length of baking parchment, said plurality of rows of cookie shaped segments and a second length of baking parchment;

(g) cutting said first and second lengths of baking parchment to form a cut laminate;

(h) rolling said cut laminate to form an a roll;

(i) placing said roll in a container;

(j) removing said roll from the container;

(k) unrolling said roll to form a generally planar laminate;

(l) removing said second length of baking parchment from said generally planar laminate to form a baking assemblage; and (m) placing said baking assemblage in the oven for cooking said plurality of cookie shaped segments.

12. A method as defined in claim 11 including the further step of chilling said uncooked dough prior to compacting said dough.

13. A method as defined in claim 11 including the further step of freezing said unrollable roll.

14. A method as defined in claim 11 in which the equipment used in the method of preparing, packaging and cooking the cookie dough further comprises a forming plate reciprocally mounted within the hopper, the forming plate having a plurality of generally circular apertures and in which said method comprises the further step of pressing the uncooked cookie dough into the generally circular shaped forming apertures provided in the forming plate.

15. A method as defined in claim 14 including the further step of removing the uncooked cookie dough from the forming apertures.

16. An apparatus for preparing and packaging cookie dough comprising:

(a) a supporting frame;

(b) a first conveyor connected to said supporting frame and including a first conveyor belt;

(c) a second conveyor connected to said supporting frame and including a second conveyor belt disposed proximate said first conveyor belt;

(d) forming means for forming the cookie dough into shaped segments;

(e) a first roll of heat resistant sheet material carried by said supporting frame proximate said first conveyor;

(f) first roller means carried by said supporting frame for removing a length of heat resistant sheet material from said first roll and for depositing said length of heat resistant material onto said first conveyor belt;

(g) means for depositing said shaped segments onto said length of heat resistant sheet material;

(h) a second roll of covering material carried by said supporting frame proximate said first conveyor;

(i) second roller means carried by said supporting frame for removing a length of covering material from said second roll and for depositing said length of covering material over said shaped segments to form a laminate; and (j) cutting means carried by said supporting frame for cutting said length of heat resistant sheet material and said covering material of said laminate at a location intermediate said first and second conveyor belts.

17. An apparatus as defined in claim 16 further including rolling means for rolling said laminate into a roll.

18. An apparatus as defined in claim 16 in which said apparatus further comprises a hopper subassembly disposed proximate said supporting frame including a hopper for receiving the cookie dough and in which said forming means comprises:

(a) a forming plate having a plurality of apertures, said forming plate being connected to said hopper for reciprocal movement with respect thereto;

(b) means for compacting the dough into the apertures of said forming plate to form said cookie shaped segments; and (c) means for removing said cookie shaped segments from said forming plate and for depositing them on said heat resistant sheet material.

19. An apparatus as defined in claim 16 in which said cutting means comprises a cutting blade carried by said supporting frame for movement from a first, upraised position to a second, lowered position wherein said cutting blade extends between said first and second conveyor belts.

20. An apparatus as defined in claim 16 further including means for moving said second conveyor belt at a rate of speed greater than the rate of speed at which said first conveyor belt is moved.

* * * * *